Figure 1:
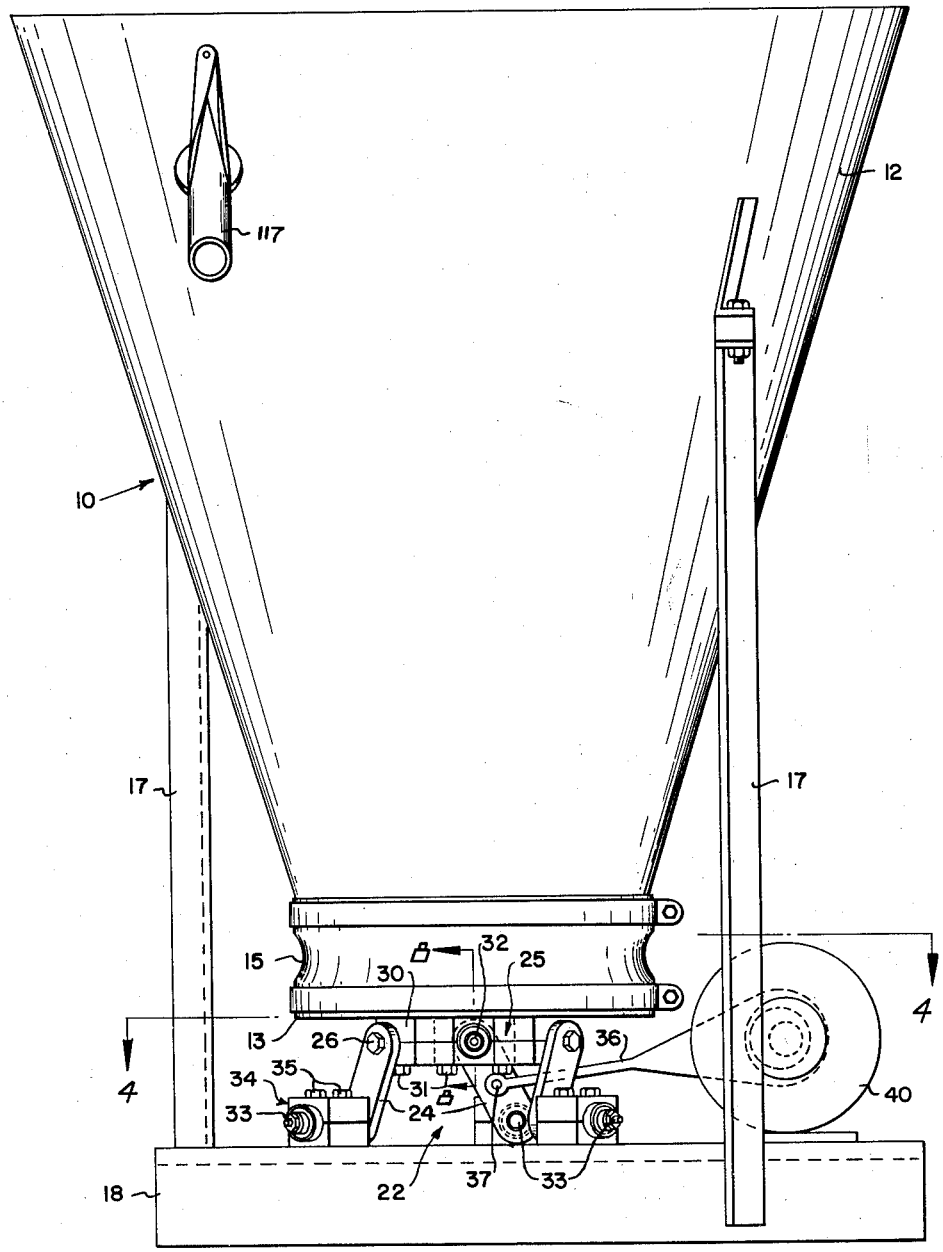

Sept. 1, 1964  E. C. WILLIAMS  3,146,918
PARTICULATE MATERIAL FEEDING APPARATUS
Filed June 11, 1962  4 Sheets-Sheet 2

INVENTOR
EDWARD C. WILLIAMS
BY
Fetherstonhaugh & Co.
ATTORNEYS

INVENTOR
EDWARD C. WILLIAMS
BY
Fetherstonhaugh & Co.
ATTORNEYS

Sept. 1, 1964   E. C. WILLIAMS   3,146,918
PARTICULATE MATERIAL FEEDING APPARATUS
Filed June 11, 1962   4 Sheets—Sheet 4

INVENTOR
EDWARD C. WILLIAMS
BY
Fetherstonhaugh & Co.
ATTORNEYS

United States Patent Office
3,146,918
Patented Sept. 1, 1964

3,146,918
PARTICULATE MATERIAL FEEDING APPARATUS
Edward C. Williams, 1378 Fernwood Crescent,
North Vancouver, British Columbia, Canada
Filed June 11, 1962, Ser. No. 201,506
13 Claims. (Cl. 222—199)

This invention relates to apparatus for feeding particulate material, and particularly fine powders, such as diatomaceous earth.

This apparatus is primarily designed for feeding small particle materials, such as granular and powdery materials, grains, and the like, but it may be used for small articles and things, and the term "particulate" is intended to include these.

The present feeding apparatus includes a vertical vibratory conveyor for handling the particulate material. Vertical vibrating conveyors are known in the prior art, but they are not satisfactory with granular and powdery materials because of the difficulty of handling these. The prior art vibratory conveyors or feeders require supply hoppers to direct material thereto, thereby requiring considerable floor space and being comparatively costly. They require vibrators for the supply hoppers, and they attempt to regulate the flow of material by controlling the amplitude of the vibrations.

Feeding apparatus according to the present invention handles the very finest materials with ease, has a vertical vibrating conveyor mounted in a hopper, thereby saving floor space and reducing cost of construction, utilizes the vibrations of the conveyor to keep the material loose in the storage hopper, and includes a simple control device for regulating the flow of material from the apparatus which is vibrated by the conveyor vibrator.

In addition to this, this apparatus includes novel means for subjecting the vertical conveyor to oscillatory and vibratory motions which is an improvement over the equivalent arrangements of the prior art.

Feeding apparatus according to the present invention comprises a storage hopper, a vertical vibratory conveyor mounted in the hopper and having an entrance near the lower end thereof, means for imparting oscillatory, reciprocatory, and vibratory motion to the conveyor, and discharge means at the upper end of the conveyor. In the preferred form of the invention, the hopper has a movable bottom, and the vertical conveyor is mounted thereon and projects upwardly within the hopper. The oscillatory, reciprocatory, and vibratory motion imparting means is connected to the hopper bottom so that the motion is imparted through said bottom to the conveyor. When it is desired to regulate the flow of material from the apparatus, a special control hopper is connected to the upper end of the vertical conveyor to receive material therefrom. It is preferred to provide means in the control hopper to maintain a minimum quantity of material therein, in which case, overflow means is provided for returning excess material to the storage hopper.

Figure 2:
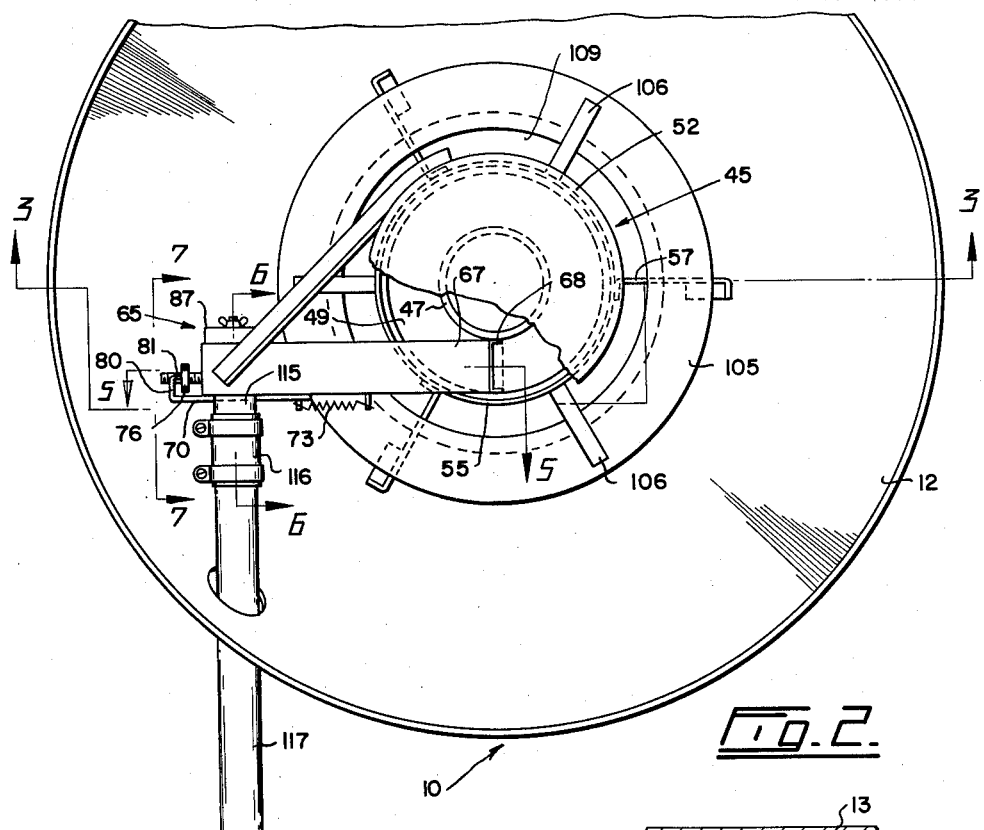
Figure 8:
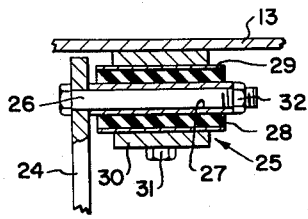
Figure 5:
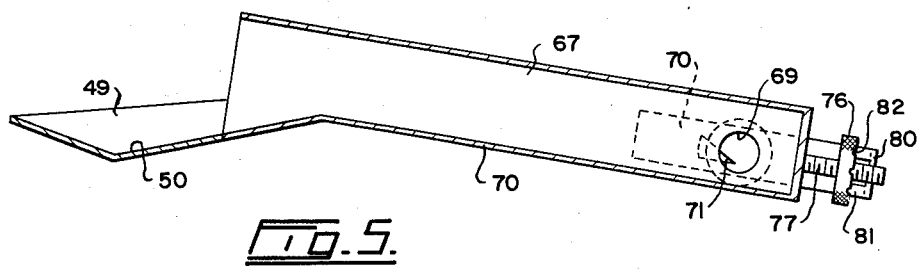
Figure 3:
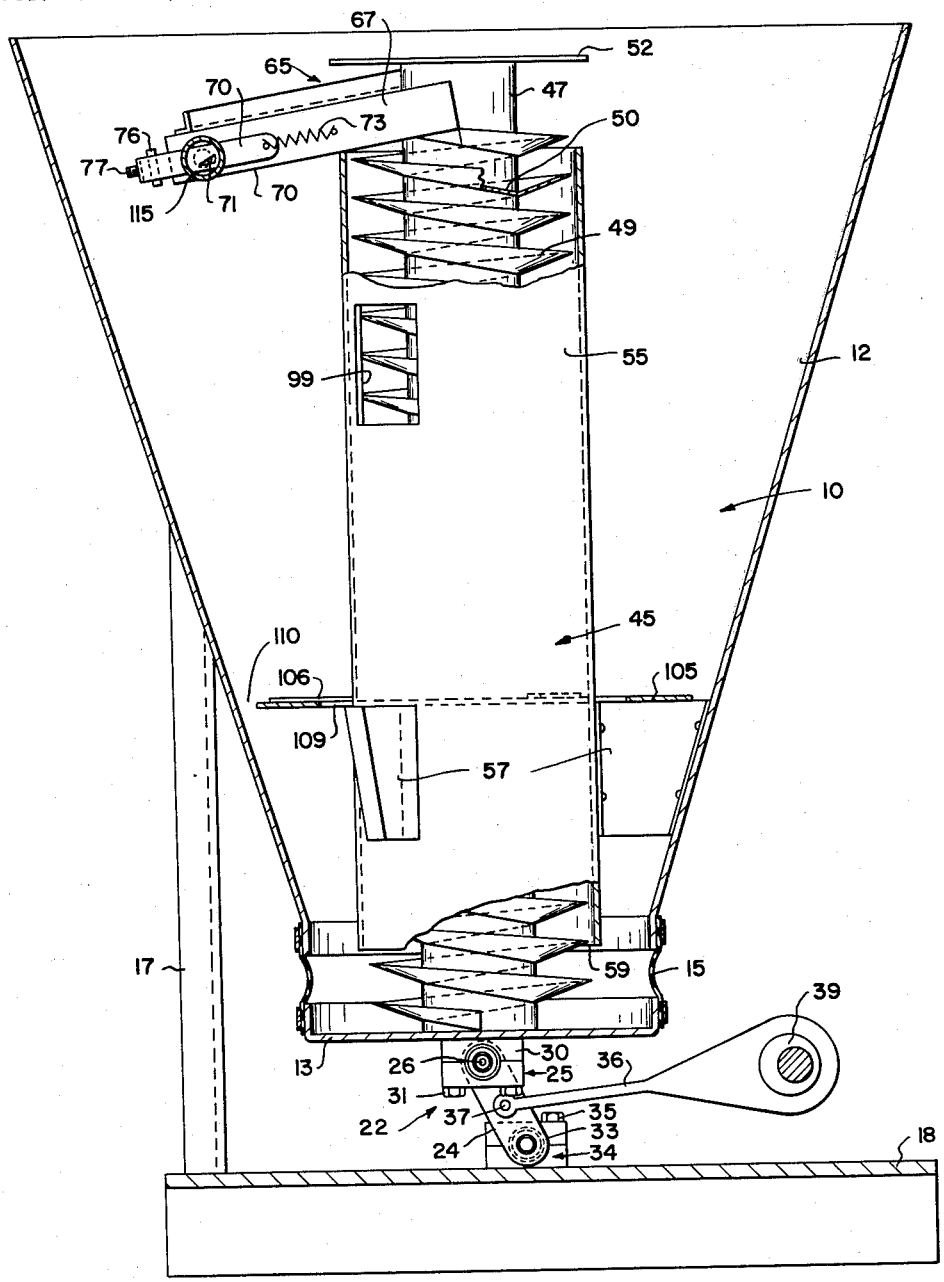
Figure 4:
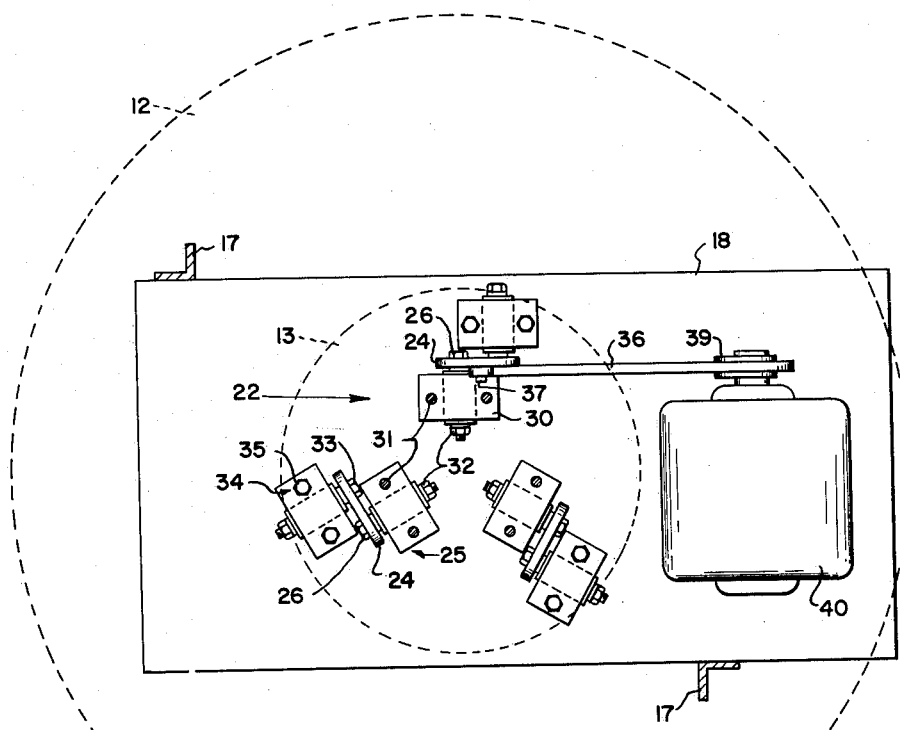
Figures 6, 7:
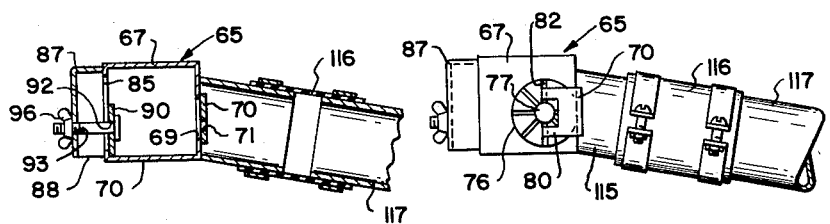

A preferred form of the invention is illustrated in the accompanying drawings, in which:

FIGURE 1 is a side elevation of the feeding apparatus;
FIGURE 2 is a plan view of the apparatus;
FIGURE 3 is a vertical section taken substantially on the line 3—3 of FIGURE 2;
FIGURE 4 is a horizontal section taken on the line 4—4 of FIGURE 1;
FIGURE 5 is a section taken on the line 5—5 of FIGURE 2;
FIGURE 6 is a cross section taken on the line 6—6 of FIGURE 2;
FIGURE 7 is a view taken on the line 7—7 of FIGURE 2; and
FIGURE 8 is a fragmentary sectional view taken on the line 8—8 of FIGURE 1.

Referring to the drawings, feeder apparatus 10 includes a relatively large hopper 12 tapering down to a bottom 13. This bottom is movable relative to the main body of the hopper and is connected thereto by a flexible sleeve 15. Hopper 12 is supported in any suitable manner, and in this case, it is carried by a plurality of legs 17 which are secured to and extend upwardly from a suitable base 18. Oscillatory, reciprocatory, and vibratory motion is imparted to hopper bottom 13 by a mechanism generally designated by the numeral 22. This mechanism includes a plurality of inclined drive links 24 arranged generally in a circle beneath bottom 13. There are preferably three of these links as shown. The upper end of each link 24 is connected by sleeve and pillow block arrangement 25 to bottom 13, see FIGURES 3, 4 and 8. With this arrangement, each link 24 has a pin or bolt 26 projecting inwardly from the upper end thereof into and through an inner metal sleeve 27 which fits tightly in a cylindrical resilient bushing 28 within and gripped by an outer sleeve 29 that is clamped between a pair of pillow blocks 30 which are secured to bottom 13 by bolts 31. A nut 32 threaded on the inner end of bolt 26 and bearing against the adjacent end of sleeve 27 draws link 24 against the opposite end of said sleeve. The lower end of each link is resiliently connected by an outwardly-extending pin or bolt 33 to a similar sleeve and pillow block arrangement 34, the pillow blocks of which are secured to base 18 by bolts 35, see FIGURES 3 and 4. Suitable means is provided for swinging or vibrating the upper ends of links 24 back and forth around the axis of pins or bolts 33. In this example, this is accomplished by means of a resilient rod 36 adjustably connected at one end to one of the links 24 by means of bolts 37, and at its opposite end to an eccentric drive 39 mounted on the drive shaft of an electric motor 40.

When motor 40 is in operation, the eccentric drive 39 vibrates the inclined link 24 to which rod 36 is connected. As all the links are connected to bottom 13, this action vibrates the other two links in the same manner. As the links swing back and forth, they rotate hopper bottom 13 in a substantially horizontal plane while at the same time, shifting said bottom in an up and down direction. Thus, the links impart an oscillatory and a vibratory motion to the hopper bottom. The resilient sleeves of sleeve and block arrangements 25 and 34 permit the relative twisting movement between stationary base 18 and moving hopper bottom 13. The rigid links impart a positive motion to the hopper bottom which may be regulated by the size or offset of the eccentric drive 39, the position of the connection between rod 36 and the link 24 to which it is connected, and the incline of the links.

A vertical vibratory conveyor 45 is mounted on base 13 and projects upwardly in hopper 12 centrally thereof. This conveyor consists of a central column 47 with a spiral ramp or passageway 49 winding therearound from the hopper bottom 13 upwardly to near the upper end of said column. This ramp or passageway has a bottom 50 that inclines inwardly towards column 47 in a cross sectional or radial direction. A cover 52 may be mounted on the upper end of column 47, and extends outwardly therefrom over the spiral passageway 49.

A tubular shield or sleeve 55 surrounds but is spaced from the spiral passageway 49 of conveyor 45. This shield is supported by hopper 12 in any convenient manner, such as by flat vertical brackets 57, each of which is connected along one edge to the sleeve and along the opposite edge to said hopper. Shield or sleeve 55 terminates at its lower end above hopper bottom 13 to form an entrance 59 at the bottom of conveyor 45. The upper end of said sleeve terminates a short distance below cover 52 and below the upper end of passageway 49.

A trough or other suitable means may be provided for directing particulate material from the upper end of conveyor passageway 49 out of the feeding apparatus. This preferred form of apparatus includes a flow regulator 65 for this purpose. The flow regulator includes an elongated control hopper 67 connected at one end to column 47 at 68 above the upper end of passageway 49. Hopper 67 extends tangentially relative to column 47 and has a downwardly-inclined bottom 70 which is positioned to receive particulate material from the upper end of passageway 49. Hopper 67 is provided with an opening 69 in a side wall thereof near its outer or lower end, and a gate 70 slidably extends over said opening, said gate having a substantially wedge-shaped opening 71 therethrough which may be moved into and out of registry with the hopper opening 69. A spring 73 biases gate 70 to the closed position, that is, with gate opening 71 out of registry with hopper outlet 69. The degree of overlap of openings 71 and 69 determines the size of the effective outlet of hopper 67. The effective size of the outlet is adjusted by means of an index wheel 76 threaded on the shaft 77 extending outwardly from the outer end of hopper 67. Gate 70 is provided at the outer end thereof with a pair of fingers 80 having tips 81 projecting inwardly therefrom to fit into radiating shallow grooves 82 formed in the outer surface of index wheel 76. When this wheel is turned on shaft 77, it moves outwardly or inwardly relative to hopper 67, the direction of movement depending upon the direction of rotation of the wheel. Outward movement of the index wheel moves gate 70 in the same direction against the tension of spring 73 to increase the size of the effective outlet of control hopper 67. Rotation of the index wheel in the opposite direction permits spring 73 to draw gate 70 inwardly to reduce the size of the outlet of the hopper.

It is desirable to maintain a minimum quantity of particulate material in control hopper 67, and to provide overflow means for returning excess material to storage hopper 12. This is accomplished in this example by providing a relatively large hole 85 in the side wall of hopper 67 opposite opening 69 thereof. A hood 87 is removably retained against the outer surface of hopper 67 over hole 85, said hood being open at 88 at the bottom thereof. A plate 90 is located in hopper 67 opposite the hood 87, and a headed screw 91 extending through holes 92 and 93 in the plate and hood, respectively, has a nut 96 threaded on its outer end to hold these elements together. Plate 90 is wide enough to span hole 85 but is not high enough to close said hole so that it acts as a weir over which particulate material flows when the depth of said material in hopper 67 reaches the top of plate 90. The excess material flows over the plate into and out of hood 87, dropping down into storage hopper 12. When nut 96 is tightened on screw 91, plate 90 and hood 87 are retained in position. The nut may be removed from the screw to release the plate and hood so that the interior of hopper 67 may be cleaned out.

If flow regulator 65 is used, it is desirable to provide a relatively large opening 99 in sleeve 55 beneath regulator 65. This is to prevent the particulate material from piling up too high at one side of the hopper due to overflow from regulator 65.

An annular baffle plate 105 may be located within storage hopper 12. This plate rests on the upper edges of brackets 57, and has spacers 106 connected thereto and extending inwardly therefrom to engage sleeve 55. Plate 105 forms spaces 109 and 110 between the opposite edges thereof and sleeve 55 and hopper 12, respectively, through which particulate material flows. By using annular plates 105 of different widths, the sizes of spaces 109 and 110 are altered. This provides a simple means for adapting the feeder to varying grades of powder or material. A free flowing powder would use a wide annular plate with small spaces 109 and 110, while a slow flowing material would require larger spaces.

A short downwardly-inclined tube 115 fits over opening 71 of gate 70 and is secured to the side of hopper 67. This tube is connected by a flexible coupling 116 to a pipe 117 which extends through and is secured to the wall of hopper 12 near the top of the latter. Particulate material from hopper 67 flows through tube 115, coupling 116 and pipe 117 and out of the apparatus.

When feeding apparatus 10 is in use, hopper 12 is filled to the bottom of opening 99 in sleeve 55, if said opening is provided, or to near the top of said sleeve if this opening is not provided. The operation of vibrating mechanism 22 imparts a rapid helical oscillatory and reciprocatory motion to hopper bottom 13 and conveyor 45. In other words, as links 24 swing upwardly, the upper ends thereof travel upwardly along circular paths at increasing speeds, and then they travel back down said paths at decreasing speeds. If a baffle plate 105 is used in the storage hopper, the material flows downwardly through annular spaces 109 and 110. The baffle plate helps to keep the material from packing too tightly near the bottom of the hopper. The oscillatory, reciprocatory, and vibratory motion of conveyor 45 causes the material to travel upwardly along passageway 49. The theory of this action is well known in the industry, and does not require explanation here. The particulate material is discharged from the upper end of conveyor 45 into control hopper 67 where a predetermined level is maintained by weir plate 90. The excess material flows over the top of this plate into hood 87 and drops downwardly through the opening 88 at the bottom of said hood back into the storage hopper. The material flows out of hopper 67 through the effective outlet of said hopper formed by hopper opening 69 and gate opening 71, the size of the effective outlet depending upon the setting of said gate. The particulate material flows from hopper 67 through tube 115, connector hose 116, and pipe 117, the latter directing the material out of and beyond storage hopper 12.

The mounting of conveyor 45 within storage hopper 12 enables this apparatus to handle the finest materials with ease. Shield or sleeve 55 facilitates an even flow of the powder to the vibrating conveyor, and it prevents any sudden collapse of material on to the conveyor that might plug it up. The arrangement of the conveyor within the hopper reduces the amount of floor space required by this apparatus, as well as reducing the cost of the apparatus. As the bottom 13 of the hopper forms part of conveyor 45, the vibrations imparted to the conveyor result in sympathetic vibrations being set up in the material within the hopper, thereby eliminating the necessity of providing separate vibrating mechanism to cause the powder or material to feed to the conveyor without bridging in the hopper. As flow regulator 65 is connected to the upper end of the vertical conveyor, it also is subjected to vibrations from the vibrating mechanism 22 so that the latter keeps the material flowing through said regulator. By adjusting gate 70, the flow of material from the apparatus can be accurately regulated. The weir in control hopper 67 maintains a constant head of material at the effective outlet of said hopper. For example, with the combination of the constant head of material, a vibration rate of 1725 cycles per minute and an oscillating motion of approximately 0.3 inch at the outlet opening of hopper 67, results in a maintained accuracy of discharge within plus or minus 2% over a feed range of from 6 ounces to 6 pounds per hour when handling a free flowing grade of diatomaceous earth.

What I claim as my invention is:

1. Feeding apparatus for particulate materials comprising a storage hopper for particulate material, a vertical vibratory spiral conveyor mounted in the hopper and having an entrance near a lower end thereof, a plurality of inclined rigid links arranged substantially in a circle beneath the conveyor and having pins projecting laterally from upper and lower ends thereof, said links being inclined in the same direction, resilient connecting means supporting the pins of each link, the connecting means of the pins at the upper ends of the links being secured to the conveyor and the connecting means of the pins at the lower ends of the links being secured to a base, means connected to a link to swing the links back and forth to impart a rapid helical oscillatory motion to the spiral conveyor to direct material from the bottom of the hopper to the top of the conveyor, and discharge means at an upper end of the conveyor through which material can flow therefrom.

2. Feeding apparatus for particulate materials comprising a storage hopper for particulate material, a movable bottom for the hopper mounted for vertical reciprocatory and rotational oscillatory movement, a vertical vibratory spiral conveyor mounted on said bottom to move therewith and projecting upwardly in the hopper, said conveyor having an entrance near a lower end thereof, a plurality of inclined links arranged substantially in a circle beneath the hopper bottom and having pins projecting laterally from upper and lower ends thereof, said links being inclined in the same direction, resilient connecting means supporting the pins of each link, the connecting means of the pins at the upper ends of the links being secured to the hopper bottom and the connecting means of the pins at the lower ends of the links being secured to a base, means connected to a link to swing the links back and forth to impart a rapid helical oscillatory motion to the hopper bottom and the spiral conveyor to direct material from the bottom of the hopper to the top of the conveyor, and discharge means at an upper end of the conveyor through which material can flow therefrom.

3. Feeding apparatus for particulate materials comprising a storage hopper for particulate material, a vertical spiral ramp mounted for vertical reciprocatory and rotational oscillatory movement within the hopper, means to mount said spiral ramp for vertical reciprocatory and rotational oscillatory motion within the hopper, means defining an entrance for particulate material near a lower end of said spiral ramp, means to impart vertical reciprocatory and rotational oscillatory motion to said spiral ramp to direct particulate material from the bottom of the hopper to the top of said spiral ramp, and discharge means at an upper end of the ramp to discharge particulate material from said ramp.

4. Feeding apparatus for particulate material comprising a storage hopper for particulate material, a bottom for the hopper mounted for vertical reciprocatory and rotational oscillatory movement, means to mount said hopper bottom for vertical reciprocatory and rotational oscillatory motion, a vertical spiral ramp mounted on said bottom to move therewith and projecting upwardly in the hopper, means to impart vertical reciprocatory and rotational oscillatory motion to the hopper bottom to thereby impart said motion to the spiral ramp to direct material from the bottom of the hopper to the top of the ramp and to impart sympathetic vibrations in material in the hopper, and discharge means at an upper end of the spiral ramp to discharge material from said ramp.

5. Feeding apparatus for particulate materials comprising a storage hopper for particulate material, a vertical vibratory spiral conveyor mounted in the hopper and having an entrance near a lower end thereof, means to mount said spiral conveyor for rapid helical oscillatory motion, means to impart rapid helical oscillatory motion to said spiral conveyor to direct material from the bottom of the hopper to the top of the conveyor, a control hopper fixedly connected at an end thereof to and extending outwardly from the upper end of the conveyor to receive material from the latter and oscillate with said conveyor, and control means in said control hopper near an outer end thereof for regulating the flow of material therefrom.

6. Feeding apparatus for particulate materials comprising a storage hopper for particulate material, a vertical vibratory spiral conveyor mounted in the hopper and having an entrance near a lower end thereof, means to mount said spiral conveyor for rapid helical oscillatory motion within the hopper, means to impart rapid helical oscillatory motion to said spiral conveyor to direct material from the bottom of the hopper to the top of the conveyor, a control hopper fixedly connected at an end thereof to and extending outwardly from the upper end of the conveyor to receive material from the latter and oscillate with said conveyor, control means in said control hopper near an outer end thereof for regulating the flow of material therefrom, means in said control hopper for maintaining a minimum quantity of material therein at said control means, and overflow means in the control hopper at said minimum quantity maintaining means for returning excess material to the storage hopper.

7. Feeding apparatus for particulate materials comprising a storage hopper for particulate material, a bottom for the hopper mounted for rapid helical oscillatory movement, a vertical spiral ramp mounted on said bottom to move therewith and projecting upwardly in the hopper, means to mount the hopper bottom for rapid helical oscillatory motion, a sleeve carried by the hopper free of and surrounding said spiral ramp, an entrance for the ramp at the lower end of the sleeve above the hopper bottom, means to impart rapid helical oscillatory motion to the hopper bottom and spiral ramp to direct material from the bottom of the hopper to the top of the ramp and to impart sympathetic vibrations in material in the hopper, and discharge means at an upper end of the ramp through which material can flow therefrom.

8. Feeding apparatus for particulate materials comprising a storage hopper for particulate material, a bottom for the hopper, means to mount said bottom for rapid helical oscillatory movement, means to secure a spiral passageway on and extending upwardly from the hopper bottom to form a vertical conveyor moveable with said bottom, a sleeve carried by the hopper surrounding and spaced from the spiral passageway, an entrance for the conveyor at the lower end of the sleeve above the hopper bottom, means to impart rapid helical oscillatory motion to the hopper bottom and the spiral passageway to direct material from the hopper bottom to the top of said passageway, and discharge means at the upper end of the passageway through which material can flow therefrom.

9. Feeding apparatus for particulate materials comprising a storage hopper for particulate material, a bottom for the hopper, means to mount said bottom for vertical reciprocatory and rotational oscillatory movement, a vertical spiral ramp secured to said bottom to move therewith and projecting upwardly in the hopper, a sleeve carried by the hopper and surrounding said spiral ramp, an entrance for the ramp at the lower end of the sleeve above the hopper bottom, an annular plate in the hopper surrounding said sleeve, said plate being spaced from the sleeve and the hopper, means to impart vertical reciprocatory and rotational oscillatory motion to the hopper bottom and the spiral ramp to direct material from the bottom of the hopper to the top of the ramp and to impart sympathetic vibrations in material in the hopper, and discharge means at an upper end of the ramp through which material can flow therefrom.

10. Feeding apparatus for particulate material comprising a storage hopper for particulate material, a vertical spiral ramp mounted in the hopper for vertical reciprocatory and rotational oscillatory movement and having an entrance near a lower end thereof, means to mount said ramp for vertical reciprocatory and rotational oscillatory motion, means to impart rapid vertical reciprocatory and rotational oscillatory motion to said spiral ramp to direct material from the bottom of the hopper to the top of the ramp, a control hopper fixedly connected at an end thereof to and extending outwardly from the upper end of the ramp and extending outwardly and downwardly therefrom to receive material from and to oscillate with said ramp, and an adjustable outlet for the control hopper near an outer end thereof through which said material flows.

11. Feeding apparatus as claimed in claim 10 including an overflow opening in the control hopper near said adjustable outlet, and a weir plate at said overflow opening to maintain a predetermined depth of material in said control hopper at said adjustable outlet.

12. Feeding apparatus for particulate materials comprising a storage hopper for particulate material, a bottom for the hopper, means to mount said bottom for vertical reciprocatory and rotational oscillatory movement, a vertical vibratory spiral conveyor secure to said bottom to move therewith and projecting upwardly in the hopper, said spiral conveyor having an entrance near a lower end thereof, means to impart rapid helical oscillatory motion to the hopper bottom and the spiral conveyor to direct material from the bottom of the hopper to the top of the conveyor and to impart sympathetic vibrations in material in the hopper, a control hopper fixedly connected at an end thereof to and extending outwardly from the upper end of the conveyor and extending outwardly and downwardly therefrom to receive material from and to oscillate with said conveyor, an adjustable outlet for the control hopper near an outer end thereof through which said material flows, and an opening in the sleeve beneath the control hopper.

13. Feeding apparatus as claimed in claim 12 including an overflow opening in the control hopper near said adjustable outlet and a weir plate at said overflow opening to maintain a predetermined depth of material in said controll hopper at said adjustable outlet.

References Cited in the file of this patent

UNITED STATES PATENTS

| | | |
|---|---|---|
| 1,507,516 | Richardson | Sept. 2, 1924 |
| 1,778,589 | Eerkes | Oct. 14, 1930 |
| 2,520,545 | Hughes | Aug. 29, 1950 |
| 2,543,344 | Tutsch | Feb. 27, 1951 |
| 2,685,986 | Hampton | Aug. 10, 1954 |